United States Patent [19]
Florence

[11] 3,973,855
[45] Aug. 10, 1976

[54] CONNECTING DEVICE FOR PANELS AND TUBES

[75] Inventor: Edwin Florence, Bromley, England

[73] Assignee: Edwin Florence, Limited, England

[22] Filed: Apr. 30, 1975

[21] Appl. No.: 573,053

[52] U.S. Cl. ................................ 403/171; 52/753 D
[51] Int. Cl.² ......................................... F16B 13/00
[58] Field of Search .................... 46/31, 28, 29, 23;
403/295, 171, 176; 52/753 D, 753 C, 753 T,
758 D, 285

[56] References Cited
UNITED STATES PATENTS

| | | | |
|---|---|---|---|
| 3,545,123 | 12/1970 | Muller | 46/29 |
| 3,638,803 | 2/1972 | MacMillan | 52/758 H |
| 3,685,465 | 8/1972 | Haumer | 403/295 |
| 3,851,980 | 12/1974 | Worth | 52/758 H |

FOREIGN PATENTS OR APPLICATIONS
1,090,694 10/1954 France ................................ 403/171

Primary Examiner—Andrew V. Kundrat
Attorney, Agent, or Firm—Hauke & Patalidis

[57] ABSTRACT

A connector for joining at least three tubes and at least two panels in a rectangular structure, comprising a body having at least three and not more than six pins, each for engaging the inside of a tube and extending in a direction either perpendicular to or opposite to every other pin, a recess between each pair of mutually-perpendicular pins for receiving a corner of a panel, each recess being defined by opposed parallel surfaces of a pair of spaced panel-engaging members, each of which members also has two tube-engaging surfaces each for abutting with the outside of a tube fitted to one of the pins of the said pair of mutually-perpendicular pins.

4 Claims, 9 Drawing Figures

U.S. Patent  Aug. 10, 1976  3,973,855
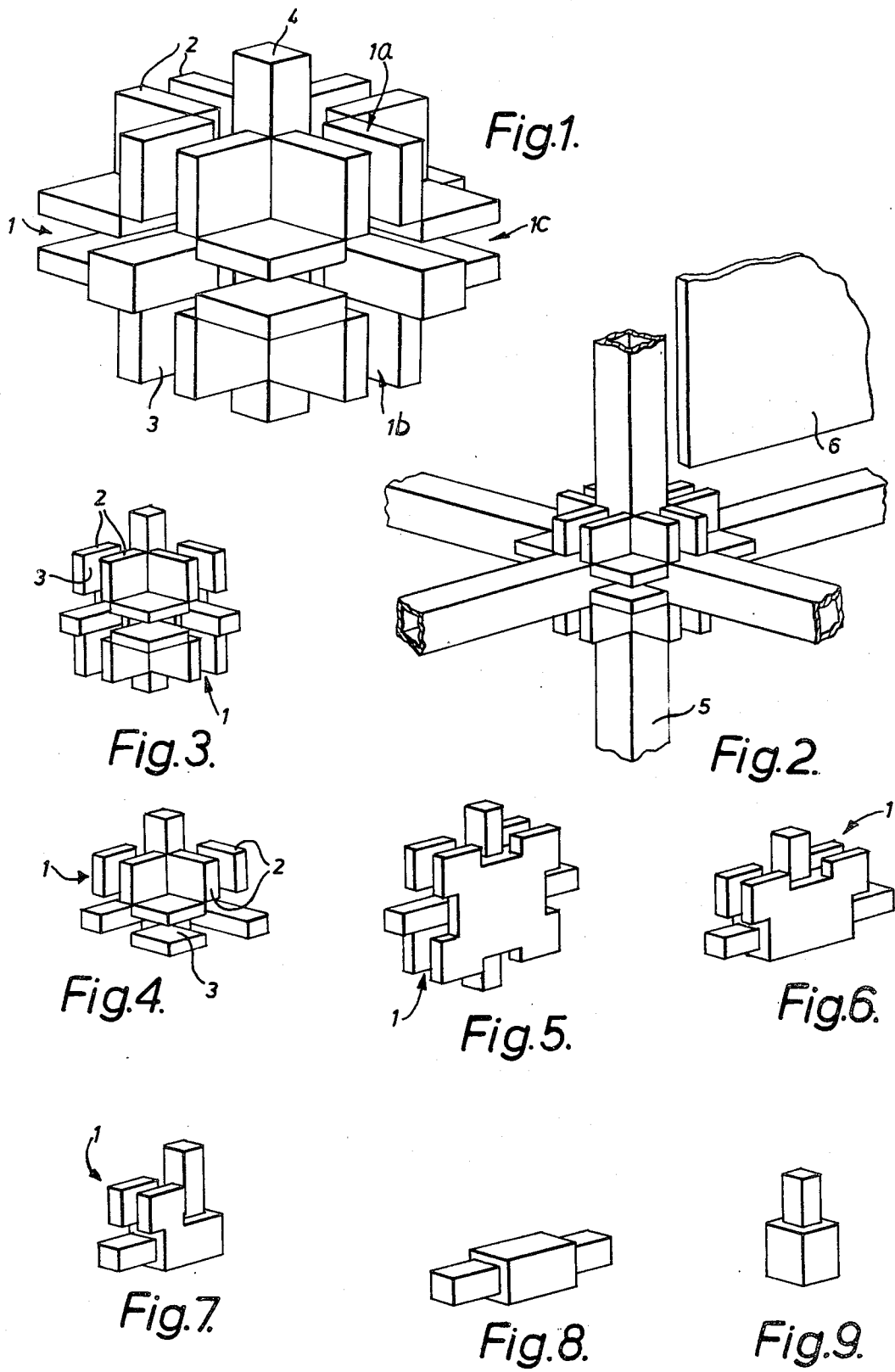

CONNECTING DEVICE FOR PANELS AND TUBES

BACKGROUND OF THE INVENTION

The invention relates to connectors for joining tubes and rectangular panels together to form a rigid structure, for example, for making up advertising displays or structures built up by means of constructional toys.

The connectors of the invention permit to interconnect tubes and panels without requiring any bolts or other fastening means for assembling the elements together, and the resulting structure has a neat and tidy appearance. A wide variety of different structures may be made up by means of tubes and panels and the connectors of the invention. When interconnected by means of connectors according to the invention, the tubes and panels are in abutment, and they therefore tend to support one another and add rigidity to the structure. The pins, integral in the connectors, are preferably of rectangular cross-section, and arranged so that when tubes of like cross-section are fitted over them, at least one flat face of each tube abuts with an edge of a panel.

The connector may be of a resiliently deformable material, e.g. nylon, in which case a panel which is slightly thicker than the distance between the locating surfaces may be inserted by deforming the spaced members apart. The members will then tend to grip the panel.

SUMMARY OF THE INVENTION

The present invention has therefore for principle object to provide a connector for joining tubes and panels in rectangular structures, without requiring any other fastening means for forming three-dimensional structures made up of tubes and panels.

The invention will be best understood when the following description of the best mode contemplated for practicing the invention is read in conjunction with the accompanying drawing representing several connectors embodying the invention given by way of example, and in which like reference numerals are used to indicate similar components in the various views, and wherein:

BRIEF DESCRIPTION OF THE DRAWINGS

FIG. 1 is an isometric view of a connector for joining up to 12 panels and up to six tubes in a rectangular framework;

FIG. 2 is an isometric view of the connector shown in FIG. 1, showing six rods connected to it and illustrating the manner in which a panel can be attached;

FIGS. 3 to 6 are isometric views of different embodiments for connecting smaller numbers of panels and tubes together in a rectangular framework;

FIG. 7 shows a connector for two tubes and one panel; and

FIGS. 8 and 9 show respectively a connector for joining two tubes and a plug for the end of a tube, which are usable with the connectors of the invention.

DETAILED DESCRIPTION OF THE PREFERRED EMBODIMENTS

Referring to the drawing and more particularly to FIGS. 1 and 2, a connector according to the present invention, preferably made of a tough, resilient plastics material, for example nylon, comprises 12 recesses 1 each formed by a pair of spaced members 2 having opposite, flat parallel locating surfaces 3. The locating surfaces of different recesses are all either parallel (e.g. recesses 1a and 1b) or perpendicular to one another (e.g. recesses 1a and 1c).

The connector also includes six mutually perpendicular locating pins 4. Each of these has a square cross-section, as illustrated and is positioned between adjacent recesses having parallel locating surfaces (e.g. recesses 1a and 1b). Six tubes 5 having an internal square cross-section of the same or slightly greater thickness than the locating pins 4 may be fitted to the connector as best shown in FIG. 2. Each tube 5 is supported by the edges of the eight surrounding spaced members. Twelve panels 6 of thickness slightly smaller than or equal to the distance between the surfaces 3 of each recess 1 may also be fitted, so that the edges of these also abut with the flat faces of the adjacent tubes.

As the material of the connector is resiliently deformable a panel of slightly greater thickness can be fitted if the spaced members 2 are deformed sightly away from one another.

FIGS. 3 to 9 show connectors for joining smaller numbers of rectangular panels and tubes, for use at corners, sides or edges of a rectangular structure.

Various combinations of different numbers of the connectors shown in FIGS. 1 to 7 can be used in making up rectangular structures of various shapes.

The connectors shown in FIG. 8 for two tubes, and the plug 9 for the end of a tube, which are outside the scope of the invention, may be included in such structues.

Having thus described the invention by way of typical embodiments thereof, what is claimed as new is as follows:

1. A connector for joining at least three tubes and for supporting at least two panels in a rectangular structure, said connector comprising a body having at least three pins, each for engaging the inside of a tube and each extending from said body in a direction perpendicular to another pin, and a recess between each pair of mutually perpendicular pins for receiving a corner of a panel, said recess being defined by opposed parallel surfaces of a pair of spaced panel-engaging members and each of said members having a pair of tube-engaging surfaces each for abutting with the outside of a tube fitted to one of the pins of said pair of mutually-perpendicular pins.

2. A connector according to claim 1 in which each pin is of rectangular cross-section so that when it is fitted with a tube of like cross-section, at least one flat face of each tube abuts with an edge of an adjacent panel.

3. A connector according to claim 1 made of a resiliently deformable material.

4. A connector according to claim 3 in which the material is nylon.

* * * * *